United States Patent [19]

Szentes et al.

[11] 4,099,067
[45] Jul. 4, 1978

[54] LOAD-SHEDDING CONTROL FOR DIESEL-ELECTRIC SETS

[75] Inventors: John Francis Szentes; Ward Welton Reeser; Charles Leslie Zuck, Jr., all of Peoria, Ill.

[73] Assignee: Caterpillar Tractor Co., Peoria, Ill.

[21] Appl. No.: 607,524

[22] Filed: Aug. 25, 1975

[51] Int. Cl.² ............................................. H02P 9/00
[52] U.S. Cl. ..................................... 307/153; 322/25
[58] Field of Search ...................... 307/153, 93, 102; 322/21, 25, 75, 68, 28, 22, 23; 290/40 C, 40 R; 317/13, 31; 323/87; 361/21; 340/248 C, 253 A

[56] References Cited

U.S. PATENT DOCUMENTS

| 1,969,587 | 8/1934 | Suits | 307/153 |
|---|---|---|---|
| 2,119,406 | 5/1938 | Stratton | 322/25 |
| 2,767,364 | 10/1956 | Guggi | 323/87 |
| 2,877,404 | 3/1959 | Zenner et al. | 322/25 |
| 3,242,417 | 3/1966 | Bertschi | 322/25 |
| 3,351,845 | 11/1967 | Roof et al. | 322/75 |
| 3,474,323 | 10/1969 | Kilgore et al. | 322/28 |
| 3,663,946 | 5/1972 | Iwaki | 322/25 |

Primary Examiner—David Smith, Jr.
Attorney, Agent, or Firm—Phillips, Moore, Weissenberger, Lempio & Majestic

[57] ABSTRACT

A load-shedding control for diesel-electric motor-generator sets, which allows temporary overloads to be accommodated without engine lugging by reducing the line voltage if an attempt is made to draw more than a presettable maximum normal wattage. The line voltage reduction is accomplished by automatically increasing the impedance of the voltage regulator input circuit when a signal generally proportional to line voltage and load current exceeds a preset reference signal to which it is compared.

12 Claims, 2 Drawing Figures

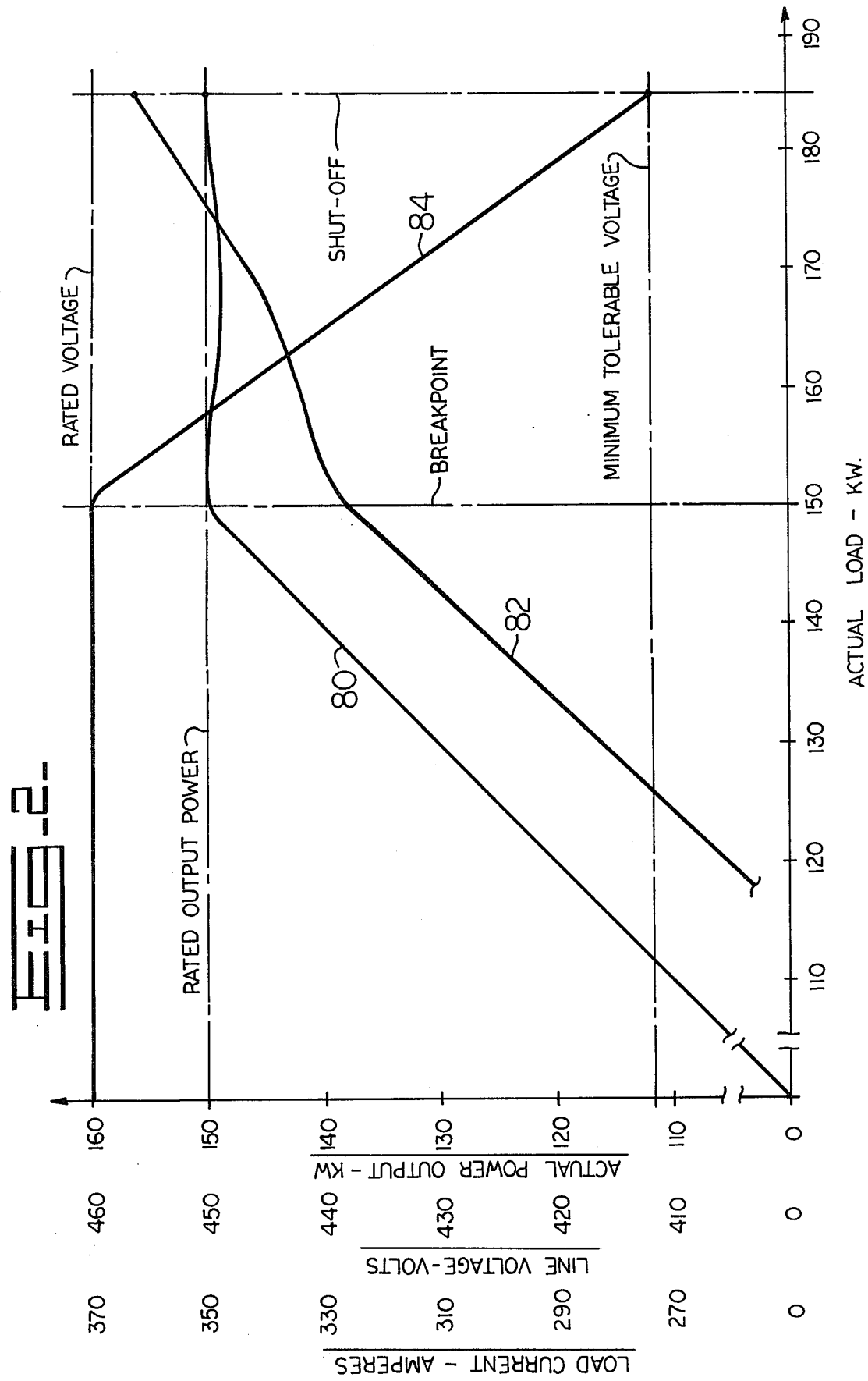

LOAD-SHEDDING CONTROL FOR DIESEL-ELECTRIC SETS

BACKGROUND OF THE INVENTION

Stand-by generators for supplying emergency power in case of a power failure are standard equipment in hospitals and other environments where maintenance of power under any circumstances is critical. These emergency sets are often rather sizeable diesel-powered machines and tend to be quite costly in spite of the fact that they are seldom used. Consequently, purchasers tend to specify a bare minimum capacity for the equipment which results in frequent though intermittent overloads when the equipment does go into action.

When overloaded, a diesel-electric generator goes into a lug mode which not only causes undesirable frequency and voltage fluctuations, but more seriously, causes mechanical stresses which are likely to do severe internal structural damage to the diesel engine in short order.

To prevent lugging, motor-generator sets are commonly provided with circuit breakers which trip when an overload occurs. This, however, is very undesirable in many instances; for example, in an operating room, it is much preferable for the lights to dim rather than to go out completely, even for a short period of time.

SUMMARY OF THE INVENTION

The present invention overcomes the problems of the prior art in a simple and inexpensive manner by reducing the output line voltage of the generator (or rather alternator, as the systems involved are normally three-phased AC systems) when necessary to keep the total load within the limits of the diesel engine's capacity. This result is accomplished by producing a load signal which is a selectable function of line voltage and load current comparing the load signal to a reference signal; and increasing the input impedance to the voltage regulator of the set when the load signal exceeds the comparison signal. This impedance increase, in effect, makes it falsely appear to the voltage regulator that the line voltage is rising, whereupon the voltage regulator will reduce the line voltage by throttling down the alternator's field winding current.

It is the primary object of the invention to provide load-shedding means for electric generating sets powered by internal combustion engines to allow them to tolerate temporary overloads without lugging by reducing the line voltage when the actual load on the set exceeds a predetermined level.

It is another object of the invention to provide a load-shedding capability as aforesaid by varying the impedance of the input circuit of a voltage regulator for an alternator as a function of the actual load on the alternator when the actual load exceeds a predetermined level.

It is a further object of the invention to accomplish the aforesaid variation by producing a signal proportional to a function of line voltage and load current, comparing that signal to a reference signal in a comparator, and using the output of the comparator, when the load signal exceeds the reference signal, to drive a control transistor so as to vary the impedance of the input circuit of the voltage regulator.

BRIEF DESCRIPTION OF THE DRAWINGS

FIG. 2 is a graph showing the operation of the circuit of FIG. 1.

DESCRIPTION OF THE PREFERRED EMBODIMENT

Figure 1:
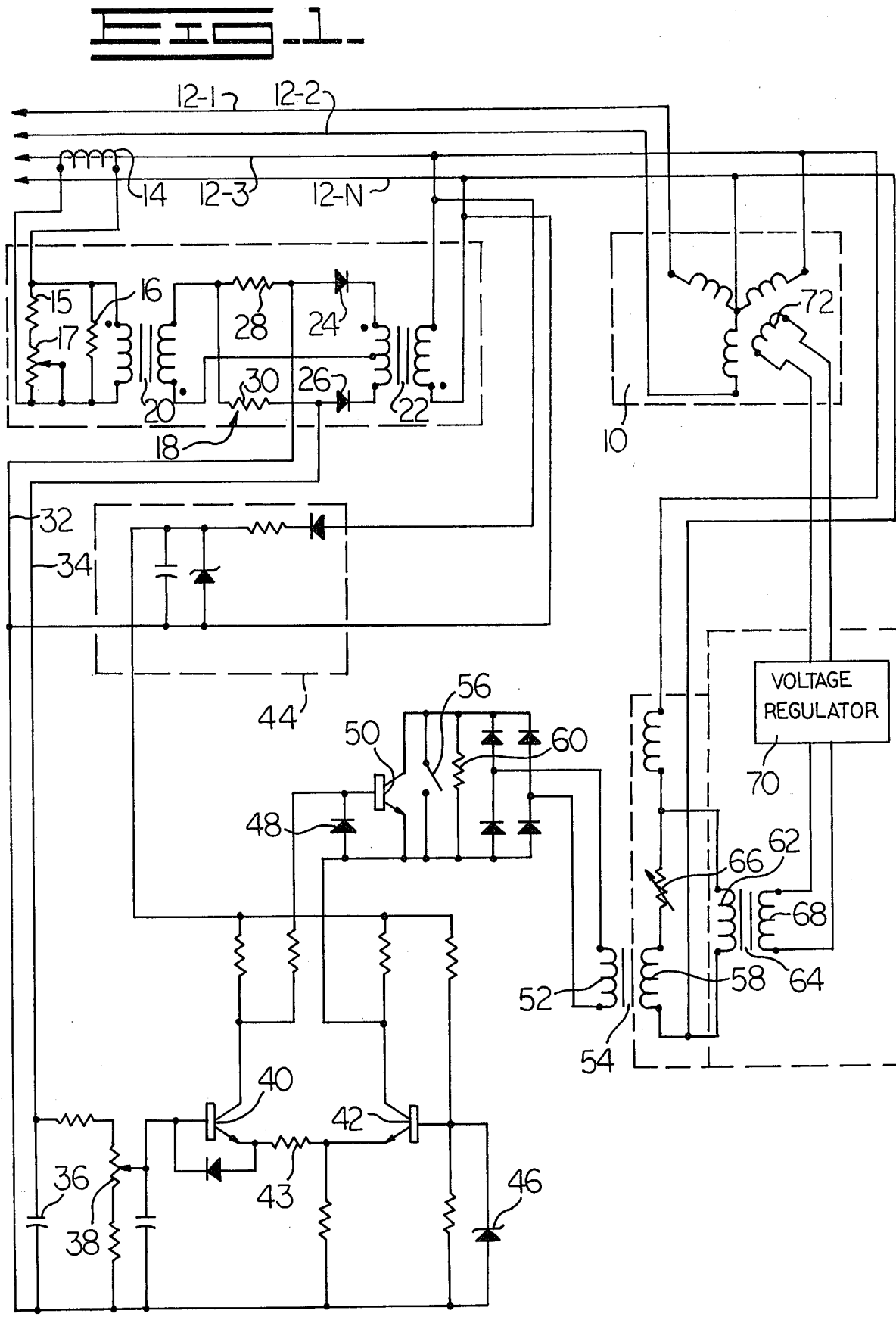
FIG. 1 is a schematic circuit diagram showing the circuit of this invention.

In FIG. 1 of the drawing, the numeral 10 denotes the alternator, which is of conventional construction and which is driven by a suitable source of motive power, usually an internal combustion engine of an appropriate type (not shown). The output of alternator 10 appears on the output buses 12-1, 12-2, 12-3 and 12-N representing, respectively, phases 1, 2 and 3 and the neutral wire of the power system.

A current-sensing coil 14 is connected to bus 12-3 in such a manner as to produce an AC signal proportional to the load current in bus 12-3. (As a practical matter, the load is usually well enough balanced to make the current in bus 12-3 reasonably equal to that in buses 12-1 and 12-2).

The load current signal developed by coil 14 across the resistive network composed of resistors 15, 16 and gain control potentiometer 17 constitutes one input to the watt-meter circuit 18 through transformer 20. Potentiometer 17 provides a variable gain for transformer 20 for a purpose hereinafter described. The other input through transformer 22 is the line voltage across buses 12-3 and 12-N. Tracing the outputs of the secondaries of transformers 20 and 22 through the full-wave rectifier diodes 24, 26 and resistors 28, 30, it wll be noted that the current and voltage signals in wattmeter circuit 18 cancel each other at a power factor of zero and reinforce each other at a power factor of unity. Consequently, the output of circuit 18 across leads 32, 34 is a function which may be expressed as $kI_L \cdot V_L \cdot pf$ in which $I_L$ is the load current, $V_L$ is the line voltage, pf is the power factor, and k is a proportionality factor determined by the setting of potentiometer 17. For reasons hereinafter discussed, k is preferably greater than one (1).

The smoothing effect of capacitor 36 provides a DC load signal across breakpoint control potentiometer 38. Potentiometer 38 determines the power output level at which load shedding starts to occur.

Transistors 40 and 42, together with their associated circuitry, including particularly proportioning resistor 43 and power supply 44, constitute a differential amplifier functioning as a comparator which compares the signal picked off by the slider of potentiometer 38 with the fixed reference voltage developed across Zener diode 46. The output of the comparator circuit across diode 48 is the control signal for the control resistor 50.

As long as the load signal at the base of comparator transistor 40 is smaller than the reference voltage across Zener diode 46, control transistor 50 conducts freely and essentially short-circuits the secondary winding 52 of impedance control transformer 54. If it is desired to disable to load-shedding feature (as, e.g., when two or more generating sets are to be connected in parallel), the same result can be accomplished by closing disabling switch 56.

As the load rises, a point comes where the voltage on the base of comparator transistor 40 exceeds the reference voltage, and the comparator circuit produces an output across diode 48 which gradually increases the impedance of control transistor 50 as the load continues to rise. If the disabling switch 56 is open, the primary winding 58 of impedance control transformer 54 now sees an increasing impedance, limited by the impedance of limiting resistor 60, instead of the short circuit it saw previously. Consequently, the impedance connected in parallel with primary winding 62 of excitation control transformer 64 gradually increases with increasing load from essentially $R_{66}$ to essentially $R_{66} + iR_{60}$, in which $R_{66}$ is the resistance of variable resistor 66, $R_{60}$ is the resistance of limiting resistor 60, and $i$ is a proportionality factor determined by the parameters of impedance control transformer 54.

The impedance increase in the parallel path across winding 62 causes the secondary winding 68 of excitation control transformer 64 to see, in essence, an apparent rise in line voltage. The conventional voltage regualtor 70 translates this into a reduction of the excitation of the field winding 72 of alternator 10, and the real line voltage on buses 12-1, 12-2 and 12-3 drops as a result.

Inasmuch as the load-shedding range of the device is limited by the turn-off characteristics of control transistor 50, conventional circuit breakers (not shown) are preferably provided to dump the load entirely when the overload reaches a level where the resulting current of control transistor 50 becomes materially smaller than the current through limiting resistor 60.

FIG. 2 illustrates the operation of the circuit of this invention in a typical test run. FIG. 2 is a plot of actual power output (curve 80), load current (curve 82) and line voltage (curve 84) vs. rated load (at a power factor of 1.0) placed on the line.

With the load breakpoint set at 150 KW (the rated output of the set under test), the graphs of FIG. 2 show that the line voltage remains steady at the rated 460V for an applied load up to 150 KW. As the applied load increases beyond that level, the line voltage drops progressively down to an eventual 414 V (i.e., 90% of rated voltage, which is what most systems are able to tolerate). The actual power drawn from the alternator remains generally steady at or near 150 KW. By the time the circuit breakers trip for insufficient line voltage, the applied load has reached about 185 KW, which is about 23% more load than the set could stand without the load-shedding circuit of this invention.

The slope of curves 80 and 84 beyond the breakpoint is determined by the resistance of proportioning resistor 43 and by the setting of gain control potentiomemter 17. The resistance of proportioning resistor 43 is not generally a suitable parameter for varying the gain, as the comparator 40, 42 tends to become unstable unless the resistance of resistor 43 is kept within fairly narrow limits. For practical purposes, it is preferable to control circuit gain by controlling the gain of transformer 20 through potentiometer 17.

The control of the gain of transformer 20 makes it possible to obtain essentially level power output beyond the breakpoint. By adjusting the gain of transformer 20 to make the signal on lines 32, 34 more current-responsive than voltage-responsive, the signal on lines 32, 34 will continue to increase in magnitude beyond the breakpoint even though the actual power delivered by the generator stays level or even dips slightly.

By proper adjustment of the slope of curve 80 after the breakpoint through gain control potentiometer 17 and of the breakpoint itself through breakpoint control potentiometer 38, the characteristics of the load-shedding circuit of this invention can be widely varied to accomodate specific system requirements.

What is claimed is:

1. In an electrical generator set driven by an internal combustion engine and having a predetermined maximum load rating, the method of preventing engine lug under temporary overloads comprising the steps of:
    (a) producing a load signal representative of a function of the line voltage and load current of the generating set;
    (b) maintaining said line voltage essentially constant from no load to the maximum rated load; and
    (c) using said load signal to progressively reduce said line voltage under increasing overloads, so as to maintain the power output of said generating set at or near the maximum rated power output allowable upon occurrence of an overload.

2. The method of claim 1, in which said line voltage is reduced as a function of the amount by which said load signal passes said predetermined level.

3. The method of claim 1, in which said generator set is equipped with voltage regulation means, and the method comprises the additional steps of:
    (a) producing a reference signal;
    (b) comparing said load signal to said reference signal;
    (c) producing a control signal when said load signal exceeds said reference signal; and,
    (d) using said control signal to vary the input impedance of the voltage regulation means.

4. Load-shedding apparatus for preventing engine lug in an electrical generating set driven by an internal combustion engine, comprising:
    (a) means for producing a load signal representative of a function of the line voltage and load current of a generating set;
    (b) voltage regulator means for normally maintaining a constant output line voltage on said generating set; and,
    (c) means responsive to said load signal for causing said voltage regulator means to progressively reduce said line voltage when said load signal passes the level corresponding to the maximum rated load, so as to maintain the power output of said generating set at or near the maximum rated power output allowable upon occurrence of an overload.

5. The apparatus of claim 4, further comprising:
    (a) means for producing a reference signal;
    (b) comparator means connected to receive said load signal and said reference signal, and to produce a control signal when said load signal exceeds said reference signal; and,
    (c) means responsive to said control signal and connected to said voltage regulator means so as to cause said voltage regulator means to reduce said output line voltage in response to the appearance of said control sign.

6. The apparatus of claim 5, further comprising means for selectively varying the proportion in which the load current component affects said function.

7. The apparatus of claim 5, in which said voltage is a function of the amount by which said load signal exceeds said reference signal.

8. The apparatus of claim 4, further comprising means associated with said load-shedding apparatus for selectively disabling the same.

9. The apparatus of claim 4, further comprising means for adjusting said maximum rated load level.

10. Load-shedding apparatus for preventing engine lug in an electrical generating set driven by an internal combustion engine, comprising:

(a) means for producing a load signal representative of a function of the line voltage and load current of a generating set;
(b) voltage regulator means for normally maintaining a constant output line voltage on said generating set;
(c) means responsive to said load signal for causing said voltage regulator means to reduce said line voltage when said load signal passes a predetermined level;
(d) means for producing a reference signal;
(e) comparator means connected to receive said load signal and said reference signal, and to produce a control signal when said load signal exceeds said reference signal;
(f) means responsive to said control signal and connected to said voltage regulator means so as to cause said voltage regulator means to reduce said output line voltage in response to the appearance of said control signal;
(g) means for selectively varying the proportion in which the load current component affects said function; and
(h) control transistor means controlled by said control signal and connected to vary the impedance of the input circuit of said voltage regulator means in response to said control signal.

11. The apparatus of claim 10, in which said control transistor means is operationally connected in parallel with the input circuit of said voltage regulator means, is normally conducting so as to produce a small parallel impedance across said input circuit, and is rendered nonconducting by said control signal so as to increase said parallel impedance when said load signal exceeds said predetermined level.

12. The apparatus of claim 11, further comprising disabling switch means for disabling said load-shedding apparatus, said switch means being connected to short-circuit the emitter-collector circuit of said control transistor means when actuated.

* * * * *